United States Patent [19]

Barkhoudarian

[11] Patent Number: 4,549,436
[45] Date of Patent: Oct. 29, 1985

[54] SURFACE-ACOUSTIC-WAVE, DIGITIZED ANGULAR ACCELEROMETER

[75] Inventor: Sarkis Barkhoudarian, Canoga Park, Calif.

[73] Assignee: Rockwell International Corporation, El Segundo, Calif.

[21] Appl. No.: 547,289

[22] Filed: Oct. 31, 1983

[51] Int. Cl.⁴ ............................................. G01P 15/08
[52] U.S. Cl. .................................................. 73/517 A
[58] Field of Search ............ 73/517 A, 517 R, 516 R, 73/505; 310/313 R, 313 A, 313 B, 328, 329

[56] References Cited

U.S. PATENT DOCUMENTS

| | | | |
|---|---|---|---|
| 2,627,400 | 2/1953 | Lyman et al. | 73/505 |
| 2,683,247 | 7/1954 | Wiley | 73/505 X |
| 3,141,100 | 7/1964 | Hart | 73/505 X |
| 3,375,712 | 4/1968 | Postma | 73/117.4 |
| 4,096,740 | 6/1978 | Salee | 310/313 R X |
| 4,197,478 | 4/1980 | Silvus | 310/329 X |

Primary Examiner—James J. Gill
Attorney, Agent, or Firm—H. Fredrick Hamann; Harry B. Field

[57] ABSTRACT

An angular accelerometer utilizing a sensing element 10 comprising a strain member 18 and a crosswise torsion member 24, both substantially comprising flat beams 18 and 25, respectively. The strain member 18 is affixed at each end to the object whose angular acceleration is to be measured, the angular acceleration vector lying along the axis of the strain member 18. The torsion member 24 is formed with an end mass 26,26' at each end. The strain member 18 is formed from a material such as quartz whose elasticity changes in proportion to the torque it experiences. A high-frequency surface acoustic wave is sent along the strain member and the change in its frequency due to the torque in the strain member 18 is measured.

12 Claims, 2 Drawing Figures

SURFACE-ACOUSTIC-WAVE, DIGITIZED ANGULAR ACCELEROMETER

BACKGROUND OF THE INVENTION

1. Field of the Invention

This invention pertains to the art of measuring angular acceleration and especially to a crossed-beam accelerometer which employs surface acoustic waves for measuring angular acceleration.

2. Description of the Prior Art

Present devices for measuring angular acceleration are generally bulky, have low sensitivity, or have the disadvantages which accompany analog detection. Analog detection is subject to conditions which affect signal amplitude and thus instruments which utilize analog detection are subject to errors resulting from power-supply drift, connector degradation, extraneous pickup by electrical cables, etc. Some sensors have been unreliable because of the special nature of their bearings or other sensitive suspension means which have been employed. Strain-gauge accelerometers generally are relatively bulky (2–3" in diameter) and have poor sensitivity and relatively narrow dynamic range (e.g., $10^3$ to 1).

OBJECTS OF THE INVENTION

An object of the invention is to provide an angular accelerometer free from the inherent errors which accompany analog measurements.

Another object is to provide a highly sensitive, small, easily manufactured sensor for an angular accelerometer.

A further object is to provide an angular-accelerometer sensor which is immunized from the effects of linear accelerations and unwanted angular acceleration.

Yet another object is to provide a sensing element which, at least in its preferred embodiment, is free from temperature and hysteresis problems so that yielding or creeping behavior and stress-cycling losses are minimized or eliminated.

Still another object is to provide an angular accelerometer possessing a very wide dynamic range.

Other objects, advantages and novel features of the present invention will become apparent from the following detailed description of the invention when considered in conjunction with the accompanying drawing.

SUMMARY OF THE INVENTION

The objects and advantages of the invention are achieved by the use of a novel torque-sensing element in a surface acoustic wave circuit where the difference in frequency between the output and input frequencies is digitized, counted and displayed. The digitizing of the difference-frequency signal makes the accelerometer free from the inherent errors of analog measuring devices.

BRIEF DESCRIPTION OF THE FIGURES

The same elements or parts throughout the figures of the drawing are designated by the same reference characters, while equivalent elements bear a prime designation.

DETAILED DESCRIPTION OF THE PREFERRED EMBODIMENTS

Figure 1:
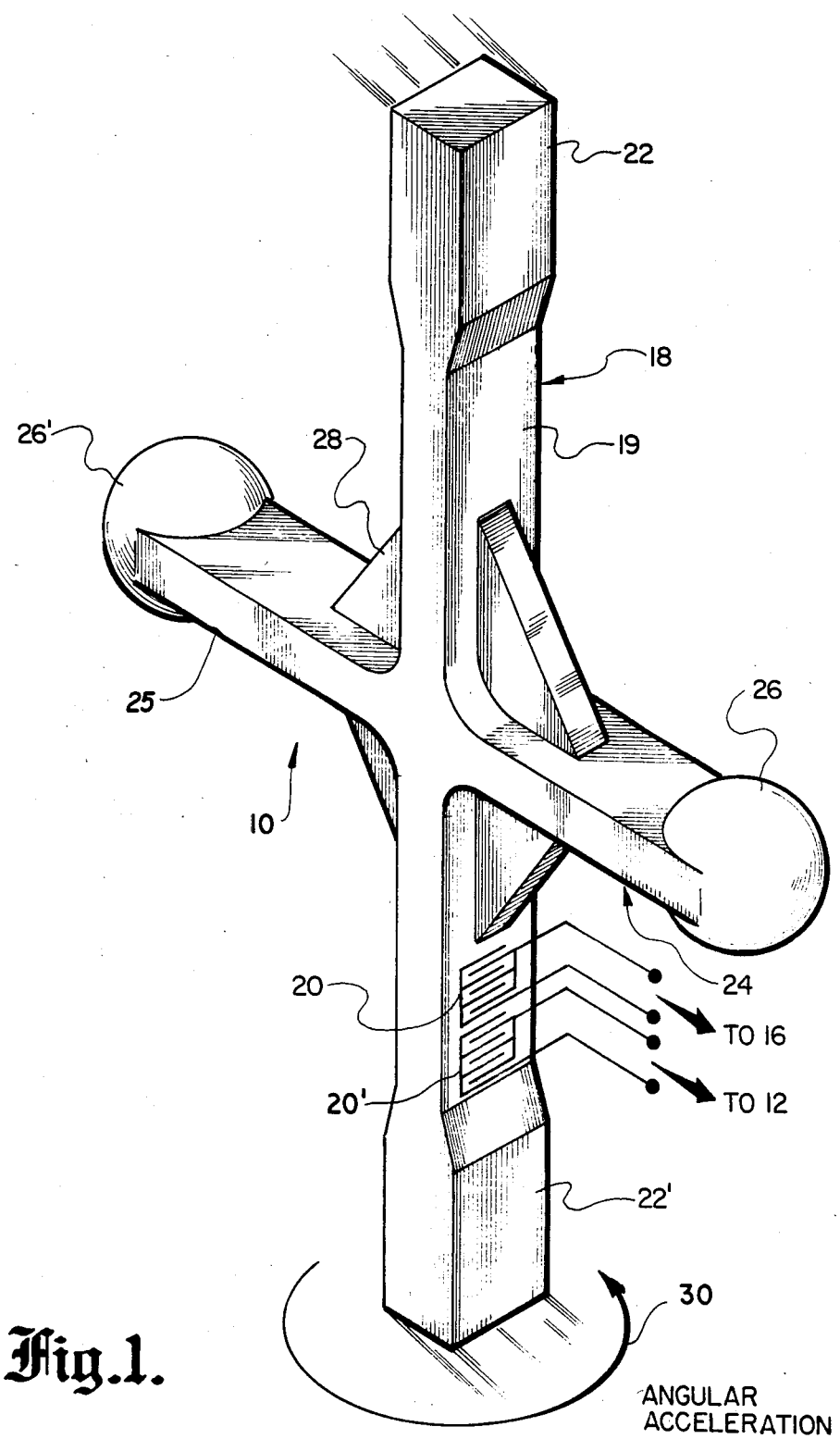
FIG. 1 is an isometric view of an embodiment of a sensing element in accordance with the invention.
Figure 2:
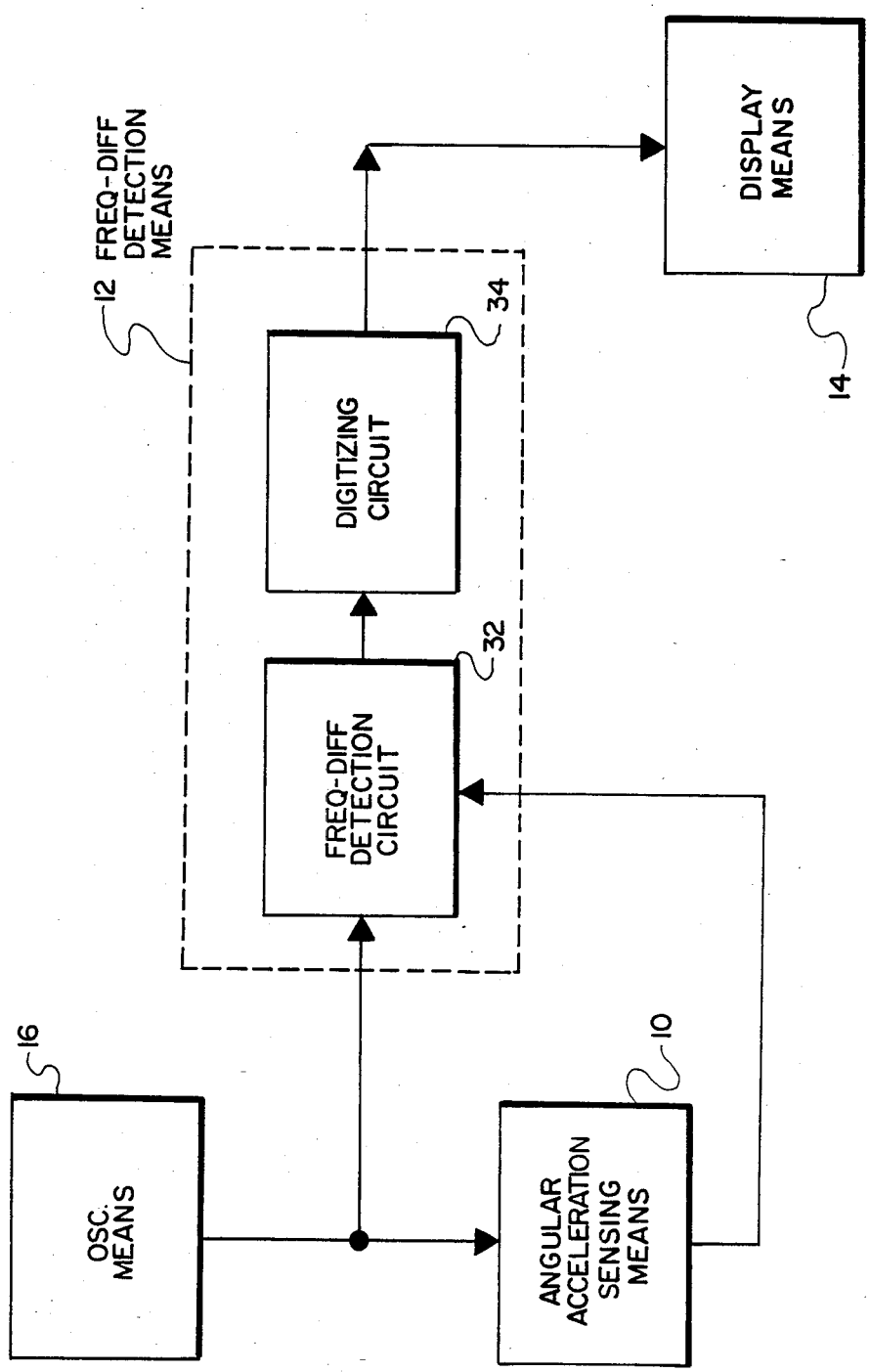
FIG. 2 is a schematic diagram of a detection circuit for use with the sensing element.

FIG. 1 shows a first embodiment of the sensing element 10 of the invention which is employed with a detection means 12 and a display means 14 (see FIG. 2).

The angular-acceleration-sensing element 10 comprises a strain member 18 formed from a strain beam 19 to which a pair of spaced interdigitated electrodes 20,20' are attached on the same side. The ends 22,22' of the beam member 18 preferably thicker than the beam 18 itself and are immovably fastened to convenient supports. For example, if the accelerometer is to be used in an airplane, then the ends are affixed to the chassis of the plane or to support members which are ultimately fastened to the plane.

A torsion member 24 comprises a central torsion beam member 25 whose longitudinal axis preferably is orthogonal to the longitudinal axis of the strain beam 19. Counter-balanced masses 26,26' are attached to the torsion beam 25, one at each end. The torque exerted on the strain member 18 increases with the mass of the counterbalanced masses (the end masses) 26,26' and with their distance from the plane through the strain member 18. The sensing element 10 becomes more sensitive with increase in mass and distance from the plane of the strain member. The torsion and strain members 18 and 24 are oriented so that the flat sides of each member would rotate into the flat sides of other member if the first member were rotated 90 degrees.

The end masses 26,26' can be formed from a material such as a metal, as can the torsion beam 25. However, for ease of fabrication, it is preferable that the whole sensing element 10 be formed from the same material as the strain member 18. The strain member 18 may be formed from a piezoelectric material such as quartz, a piezorestrictive material such as a ceramic such as $BaTiO_3$, or a magnetostrictive material which may be a ferromagnetic material such as 45 Permalloy (45 Ni—55 Fe), for example. It is preferred that the material be quartz which is piezoelectric, since Si semiconductor processing techniques can be employed which are well known and widely available. In addition, crystalline material like quartz is very stable and minimizes the temperature and hysteresis problems existing in metals because of their plasticity. Specifically, quartz is almost 100 times more stable to temperature variation than steel. Also, quartz has almost zero stress-cycling losses, exhibiting no yielding or creeping which extends the design stress, thereby making smaller accelerometers possible.

The direction of the angular acceleration (indicated by arrow 30) of the object to which the sensing element is attached induces a torque or twist in the strain member 18 wich changes the elastic properties of the beam 19. (In vector physics, the angular acceleration shown by arrow 30 would produce an angular acceleration vector upwards in the direction of the longitudinal axis of the strain beam 19.) This change in elastic properties can be measured by the use of surface acoustic waves in the surface resonance mode.

In the surface resonance method, a transmitting interdigitated electrode transducer 20 is formed on one flat surface of the strain beam 19 and a receiving interdigitated electrode transducer 20' is formed on the same flat surface of the strain beam 20' some distance away from the first electrode. Application of voltage across the sending electrode 20 from a high-frequency electrical oscillator 16 causes surface acoustic waves to travel along the flat surface of the beam 19 to the receiving transducer 20' which converts the surface acoustic wave back to an electrical wave. The frequency of the oscillator 16 may be approximately 300 MHz, for example. The frequency of the acoustic wave depends on the spacing of the fingers of the sending transducer 20 and the velocity of the surface acoustic wave is proportional to the acoustic wave frequency. The change in the elastic properties of the medium (the beam) along which the surface acoustic wave travels changes the velocity and frequency of the surface acoustic wave in proportion to the angular acceleration which is providing the stress, i.e., the torque. Thus, the frequency output of the receiving transducer 20' is different from the frequency sent by the transmitting transducer 20, and the difference in frequency is a measure of the angular acceleration which is applied to the sensing element.

FIG. 2 shows apparatus which may be used to implement the invention. An electrical high-frequency oscillator means 16 applies an electrical signal to the sending transducer 20 of the angular-acceleration-sensing means 10. The sending transducer 20 sends an acoustic signal through the strain member 18 to the receiving transducer 20' which converts the acoustic signal to an electrical signal again. The electrical signal is detected by a difference-frequency detection means 12 comprising a detection circuit 32 which detects the signal and provides an output signal proportional to the difference between its frequency and that of the oscillator means 16. The difference-frequency detection circuit 32 may, for example, be a mixer circuit. The difference-frequency signal is digitized and the frequency is determined (counted) by a digitizing circuit 34. (The term "digitizing" herein means that instead of making an amplitude measurement, i.e., an analog measurement, a time domain measurement, such as frequency or period, is made.) The difference-frequency signal count is then displayed by a display means 14. The display means 14 may be calibrated directly in units of angular acceleration, e.g., degrees or radians per second square. The digitizing circuit may be a frequency counter means, such as the Fluke 1920A model frequency counter, manufactured by the John Fluke Mfg. Co. of Mountlake Terrace, WA., 98043.

To immunize the device from the effects of linear accelerations and unwanted angular accelerations, the strain and torsion (axial and transverse) beams 19 and 25 have cross-sectional geometry which is substantially nonreactive to the effects of undesirable accelerations. However, to further improve the rigidity of the strain member 18 in the direction of the transverse axis, stiffening members 28, which are triangular in shape, are placed as braces at the intersections of the beams 19 and 25. Other shapes, for example, square, may be employed. Additional attenuation of unwanted cross-coupled acceleration can be achieved by employing damping liquids, limiting stops, stiffening ribs and appropriate orientation of the quartz crystal structure.

The axis of the torsion member 24 is shown as being orthogonal to that of the strain member 18. However, the axes do not necessarily have to be orthogonal, although this arrangement is preferred.

In physical size, the sensing element 10 could be made as small as about ⅛ from top to bottom and from side to side. The weight of the end masses might range from about a fraction of a gram to about a gram for a sensing element about 1" long.

The estimated parameters for a SAW angular accelerometer of the type described herein are:

| | |
|---|---|
| linearity | 0.1% |
| dynamic range | $10^6:1$ |
| resolution | 1 microradian/sec$^2$ |
| power | 1 milliwatt |
| drift | 0.01% per year |
| temperature coefficient | 0.005%/°F. |
| volume | 1 cc/axis |
| frequency response | 0–1000 Hz |

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A sensing element for sensing angular acceleration in terms of the torsional strain it produces comprising:
   a longitudinal strain member in the form of a flat beam, the strain beam being formed from a material the elastic properties of which change in proportion to the amount of torque experienced by the material; and
   a longitudinal torsion member in the form of a flat beam the longitudinal axis of which crosses the longitudinal axis of the strain member, said torsion beam being formed with an end mass at each end, the beams being in such orientation to each other that the flat sides of each beam would rotate into the flat sides of the other beam if one of said beams were rotated 90 degrees,
      said strain member being affixed at each end to a body whose angular acceleration is to be measured,
      the strain member being affixed to the body in an orientation such that the angular acceleration vector of the body lies along the axis of the strain member.
2. A sensing element as in claim 1, wherein:
   said beams are orthogonal to each other.
3. A sensing element as in claim 1, wherein:
   said strain member is formed from a piezoelectric material.
4. A sensing element as in claim 1, wherein:
   said strain member is formed from a piezorestrictive material.
5. A sensing element as in claim 1, wherein:
   said strain member is formed from a magnetostrictive element.
6. A sensing element as in claim 1, wherein:
   said strain member is formed from quartz.
7. A sensing element as in claim 1, wherein:
   said strain and torsion members are formed from quartz.
8. A sensing element as in claim 1, wherein:
   said end masses are equal in mass.
9. A sending element as in claim 1, further including:
   stiffening members extending between the flat sides of the beams and placed at the intersections thereof.
10. A sensing element as in claim 1, further including:
    means for sending a surface acoustic wave along at least a portion of the longitudinal extent of said strain member; and
    means for receiving said surface acoustic wave.

11. A sensing element as in claim 10, wherein:
said surface acoustic wave is sent along one surface of said strain member.

12. An angular accelerometer comprising:
a longitudinal strain member in the form of a flat beam, the strain beam being formed from a material the elastic properties of which change in proportion to the amount of torque experienced by the material; and a longitudinal torsion member in the form of a flat beam the longitudinal axis of which crosses the longitudial axis of the strain member, said torsion beam being formed with an end mass at each end, the beams being in such orientation to each other that the flat sides of each beam would rotate into the flat sides of the other beam if one of said beams were rotated 90 degrees, said strain member being affixed at each end to a body whose angular acceleration is to be measured, the strain member being affixed to the body in an orientation such that the angular acceleration vector of the body lies along the axis of the strain member;

transmitting transducer means for converting an electrical input signal to an acoustic output signal, said transducer means being located on a flat side of said strain beam;

receiving transducer means for converting an acoustic input signal to an electrical output signal, said transducer means being located on a flat side of said strain beam;

oscillator means for producing a high-frequency electrical signal to said transmitting transducer means;

frequency-difference detection means, coupled to receive the electrical output signal from said receiving transducer means, for producing a signal whose frequency is the difference in frequency between the output signal from the oscillator means and the output signal from the receiving transducer and for counting the frequency of the difference-frequency signal; and display means, connected to receive the output of said detection means, for indicating said frequency difference.

* * * * *